United States Patent
Foerster et al.

(10) Patent No.: US 8,818,688 B2
(45) Date of Patent: Aug. 26, 2014

(54) METHOD FOR OPERATING AN INTERNAL COMBUSTION ENGINE OPERATED WITH A GAS AS FUEL

(75) Inventors: Juergen Foerster, Ingersheim (DE); Winfried Langer, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 831 days.

(21) Appl. No.: 12/961,963

(22) Filed: Dec. 7, 2010

(65) Prior Publication Data

US 2011/0144889 A1    Jun. 16, 2011

(30) Foreign Application Priority Data

Dec. 8, 2009   (DE) .......................... 10 2009 047 646

(51) Int. Cl.
    *B60T 7/12*    (2006.01)
(52) U.S. Cl.
    USPC .......................................... 701/103; 123/434
(58) Field of Classification Search
    USPC ............................ 701/103; 123/434, 436, 704
    See application file for complete search history.

(56) References Cited

U.S. PATENT DOCUMENTS

| | | | | |
|---|---|---|---|---|
| 5,027,646 A | * | 7/1991 | Mizutani et al. | 73/114.73 |
| 5,040,513 A | * | 8/1991 | Schnaibel et al. | 123/488 |
| 5,811,670 A | * | 9/1998 | Nolte et al. | 73/114.72 |
| 5,867,982 A | * | 2/1999 | Tengblad et al. | 60/274 |
| 6,302,081 B1 | * | 10/2001 | Moser et al. | 123/295 |
| 7,018,442 B2 | * | 3/2006 | Driscoll et al. | 95/1 |
| 7,886,524 B2 | * | 2/2011 | van Nieuwstadt et al. | 60/285 |
| 2003/0010016 A1 | * | 1/2003 | Beer et al. | 60/274 |
| 2003/0047166 A1 | * | 3/2003 | Hess et al. | 123/436 |

* cited by examiner

*Primary Examiner* — John Kwon
(74) *Attorney, Agent, or Firm* — Michael Best & Friedrich LLP

(57) ABSTRACT

A method for operating an internal combustion engine (100), particularly of a motor vehicle, operated with a gas as fuel, a lambda value of an air/fuel mixture being regulated by means of lambda control as a function of a signal from a lambda probe (130), and, when a lean/rich jump is detected by the lambda probe (130), a mixture control factor (GRF) which controls the mixture composition being varied at least for a predeterminable time such that a shift of the lambda air ratio toward rich is caused, is characterized in that the mixture control factor (GRF) is varied in such a way that an additional defined shift of the lambda air ratio toward rich is caused.

10 Claims, 2 Drawing Sheets

METHOD FOR OPERATING AN INTERNAL COMBUSTION ENGINE OPERATED WITH A GAS AS FUEL

BACKGROUND OF THE INVENTION

The invention relates to a method for operating an internal combustion engine, particularly of a motor vehicle, operated with a gas, in particular natural gas, as fuel, a lambda value of an air/fuel mixture being regulated by means of lambda control as a function of a signal from a lambda probe.

The subject of the present invention is also a computer program and a computer program product, which are suitable for carrying out the method.

With a view to the international effort to reduce $CO_2$ emissions and adhere to ever more stringent exhaust gas limit values, natural gas is acquiring increasing importance as an alternative fuel for vehicles. In this case, natural gas can be stored both as liquid at low temperature or compressed under high pressures. In vehicles, natural gas is used in practice in almost all applications in compressed form, that is to say in gas form. In most systems, gas injection takes place into the suction pipe, as in conventional gasoline injection. The injection valves are in this case supplied with natural gas via a low-pressure common rail and inject the natural gas into the suction pipe intermittently. By the fuel being introduced completely in gas form, mixture formation is improved, since natural gas does not condense on the suction pipes and also no wall film is built up. Particularly during warming up, this has a beneficial effect on emissions. The extremely high knock resistance of natural gas allows a higher compression of the engine to approximately 13:1 in order to improve engine efficiency. A natural gas engine is therefore also ideally suitable for supercharging. The $CO_2$ emissions which are approximately 25% lower, as compared with conventional gasoline engines, are especially advantageous in natural gas vehicles. These emissions result from the favorable hydrogen/carbon ratio of almost 4:1 as compared with gasoline when this ratio amounts to 2:1 (shift of the main combustion product from $CO_2$ to $H_2O$), and from the increased engine efficiency. In addition to virtually particle-free combustion, there are, in conjunction with a regulated 3-way catalyst, only very low emissions of the pollutants NOx, CO and NMHC [non-methane hydrocarbon] (these are all hydrocarbons except for methane).

The mixture regulation in an exhaust system with a jump probe upstream of the catalyst of an engine of this type is based on a threshold value control. The mixture is successively enriched until the jump probe indicates a lambda mixture lower than 1, that is to say a rich mixture, by means of a voltage which is somewhat higher than 0.5 V. A delay (holding) time duration after rich detection causes a tendential mean rich shift. A successive reduction in the control factor subsequently takes place, until the jump probe indicates a lambda mixture higher than 1, that is to say a lean mixture, by means of a voltage lower than about 0.5 V. Before the successive reduction in the control factor, the control time is shortened by means of an additional negative offset which is locked onto the mixture factor. Control subsequently takes place toward lean with an opposite sign.

For a conversion of methane in the catalyst, a slightly rich mixture in the catalyst is required. However, on account of a lengthy holding time duration after rich detection, the mean mixture can achieve only a minimal rich shift which, depending on system tolerances, is not sufficient for optimum methane conversion in the catalyst.

SUMMARY OF THE INVENTION

The object on which the invention is based, therefore, is to provide a method for operating an internal combustion engine, particularly of a motor vehicle, operated with a gas, in particular natural gas, as fuel, which makes it possible to improve methane conversion in the catalyst.

Advantages of the Invention

This object is achieved by means of a method for operating an internal combustion engine of the type initially described, operated with a gas, in particular natural gas, as fuel, in that, after the detection of a lean/rich jump, a mixture control factor controlling the mixture composition is not only varied for at least a predeterminable time such that a tendential shift of the lambda air ratio toward rich is caused, but also that this mixture control factor is varied such that an additional defined shift of the mixture toward rich is caused. As a result of this additional shift of the mixture toward rich over a predeterminable time, methane conversion in the catalyst, which would not be possible in the case of an only tendential rich shift, as is known in the prior art is made possible for the first time.

The advantage of the method is much improved methane conversion in the catalyst.

Thus, in an advantageous refinement of the method, the defined additional shift of the lambda air ratio toward rich is caused by an increase in the mixture control factor over a predeterminable time and, if appropriate, by a subsequent holding time of the increased control factor. The mixture control factor is in this case increased further in the rich detection range when a lean mixture is detected during the holding time duration in the rich range by means of a low probe voltage.

In another advantageous refinement of the method, the shift of the lambda air ratio toward rich is caused by an additional offset for enrichment by an increase in the control factor and by a subsequent holding time of the increased control factor.

In yet another advantageous refinement of the method, the shift of the lambda air ratio of the mixture toward rich is caused by an increase in the mixture control factor over a predeterminable time or by an additional offset of the mixture control factor when a lean mixture is detected during the holding time of the increased control factor. The above method variants may also be used in combination.

BRIEF DESCRIPTION OF THE DRAWINGS

Exemplary embodiments of the invention are illustrated in the drawings which are explained in more detail in the following description.

In the drawings.

DETAILED DESCRIPTION

Figure 1:
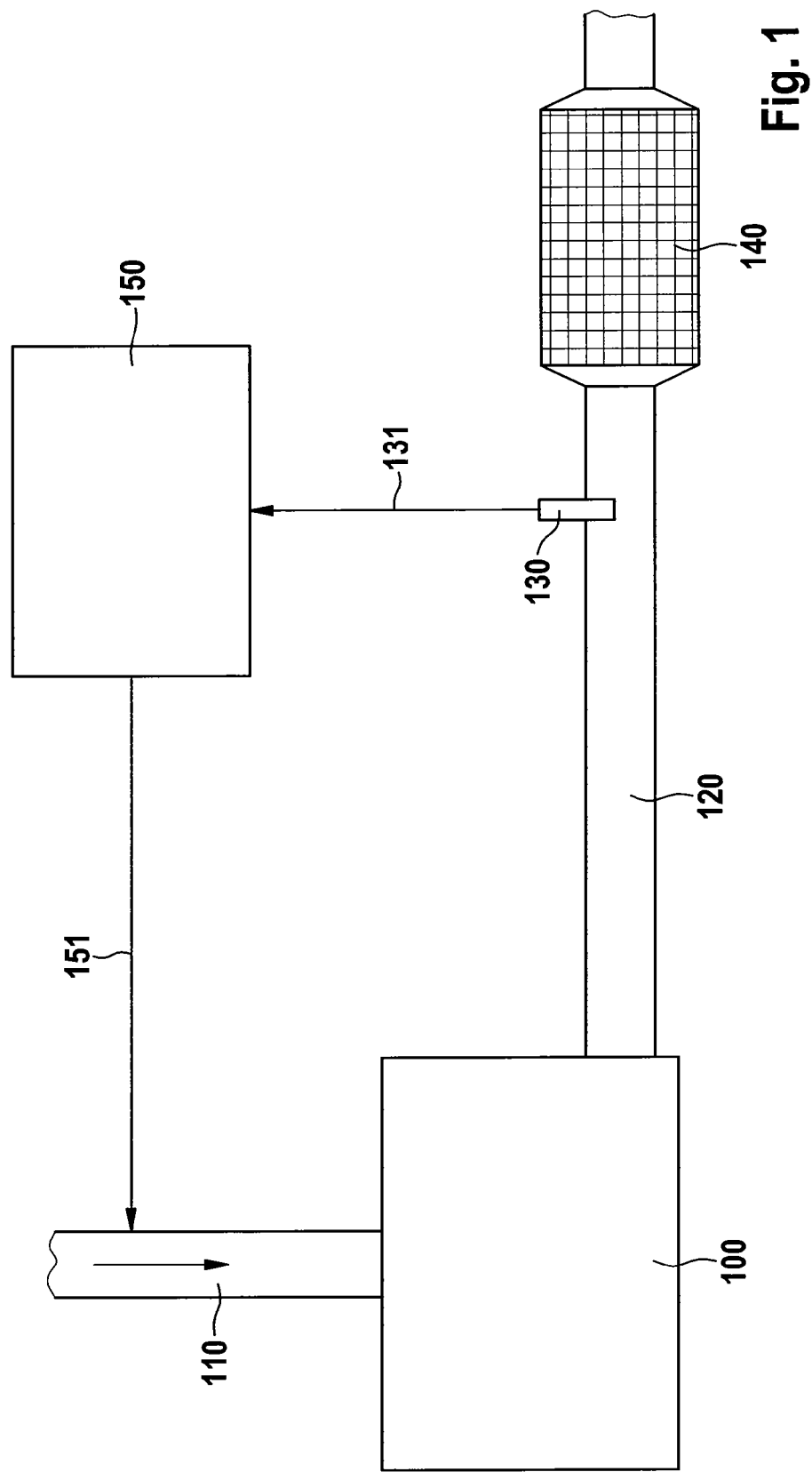
FIG. 1 shows diagrammatically an internal combustion engine with lambda control, in which the method according to the invention is used.

FIG. 1 illustrates diagrammatically an internal combustion engine 100 which is operated with a gas as fuel. Gas injection in this case takes place into a suction pipe 110. A catalyst 140 is arranged in an exhaust duct 120. Upstream of the catalyst is arranged a lambda probe 130, the output signal line 131 of which leads to a control apparatus 150. A mixture control factor GRF is determined in the control apparatus 150 as a function of the lambda value detected by the lambda probe 130 and sets the gas/air composition of the gas/air mixture supplied to the internal combustion engine 100, that is to say the fuel/air mixture, by means of an electric line 151 in a way known per se (and not illustrated in any more detail).

Figure 2:
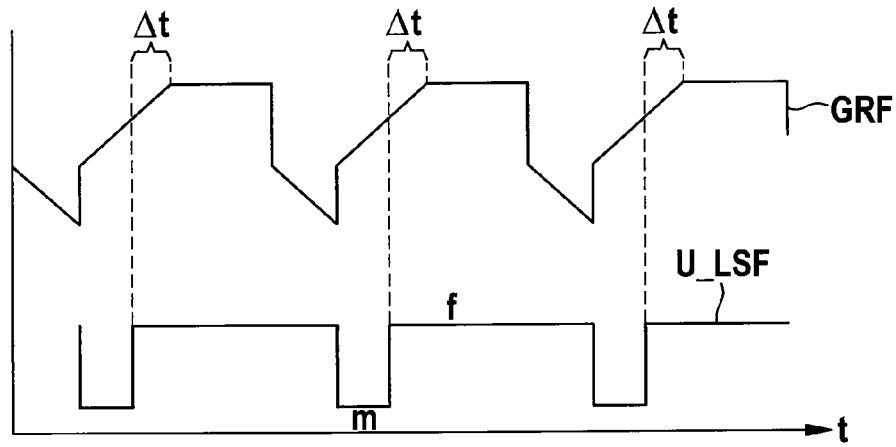
FIG. 2 shows diagrammatically the time profile of the mixture control factor and probe voltage to explain a first refinement according to the invention of the method.

Operation of internal combustion engines with gas, in particular natural gas, requires a slightly different setting of the mixture control factor GRF from that when the internal combustion engine is operated with gasoline. The main constituent of natural gas is methane ($CH_4$) with a fraction of 80 to 99%, depending on the origin of the natural gas. The rest of the natural gas is composed of inert gases, such as carbon dioxide, nitrogen and other low-grade hydrocarbons. One problem of operating with natural gas is the conversion of methane in the catalyst 140. Conversion of methane in the catalyst 140 is possible only when the mixture is slightly rich. In order to achieve such a rich mixture, there is provision according to the invention whereby, when a lean (m)/rich (f) jump is detected by the lambda probe 130, the mixture control factor GRF controlling the mixture composition is varied at least for a predeterminable time such that a significant and defined shift of the lambda air ratio toward rich is caused. In this case, in a first refinement of the method which is explained below in conjunction with FIG. 2, after a lean/rich jump is detected, illustrated by the probe voltage U_LSF of the lambda probe in the form of a jump probe, the mixture control factor GRF is increased for a predeterminable time interval, as is illustrated diagrammatically in FIG. 2 by the time intervals $\Delta t$.

Figure 3:
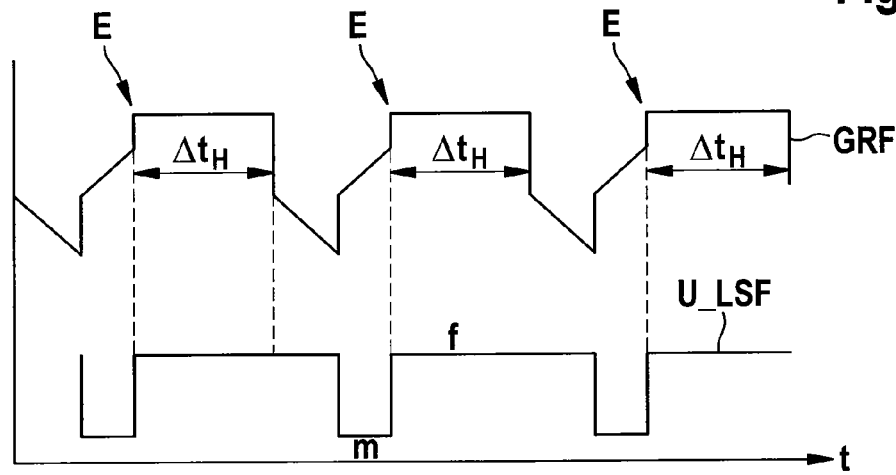
FIG. 3 shows the time profile of the mixture control factor and probe voltage to explain a further refinement according to the invention of the method.

In another variant of the method according to the invention, there is a shift of the mean lambda mixture toward rich by an additional offset from enrichment by an increase in the control factor GRF and a subsequent holding time of the increased control factor GRF. This is illustrated diagrammatically in FIG. 3. In each case after a lean/rich jump detected by the probe voltage U_LSF (m designates lean and f designates rich in the figures), an increase in the control factor E takes place, and there is a subsequent holding time $\Delta t_H$ of the increased mixture control factor GRF.

Figure 4:
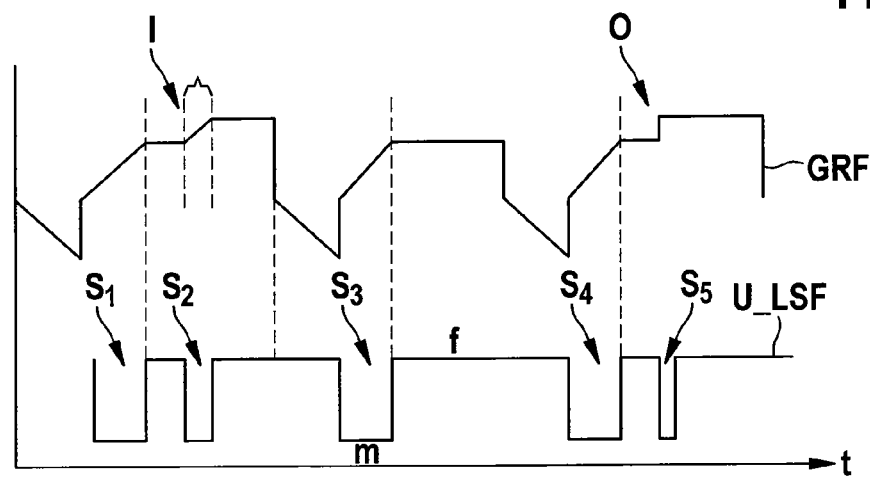
FIG. 4 shows the time profile of the mixture control factor and probe voltage to explain yet another refinement of the method according to the invention.

In yet another refinement of the method, a defined shift of the mean lambda mixture toward rich is obtained by providing a holding time and an increase in the control factor in the event of mixture depletion during the holding time by integration or offset. FIG. 4 illustrates integration I on the left side and offset O on the right side. As illustrated in FIG. 4, a first lean/rich jump S1 or S4 can be followed by a second lean/rich jump S2 or S5. A further additional shift of the mixture toward rich can be caused by integration I or offset O particularly when a further lean/rich jump S2 or S5 occurs.

By virtue of all the method variants described above, a defined shift of the lambda mixture toward rich is caused and optimal conversion of methane in the catalyst 140 is thereby achieved.

The method described above can be implemented, for example, as a computer program on a computing apparatus, in particular the control apparatus 150 of the internal combustion engine 100, and can run through there. The program code can be stored on a machine-readable carrier which the control apparatus 150 can read. Even retrofits are thus readily possible, since additional hardware is not required for implementing the method.

The invention claimed is:

1. A method for operating an internal combustion engine, wherein the internal combustion engine is operated with a gas as fuel and a lambda value of an air-to-fuel mixture is regulated by means of lambda control as a function of a signal from a lambda probe, the method comprising:
   detecting, by the lambda probe, a rich-to-lean jump of the lambda value;
   varying, by a control apparatus, upon detection of the rich-to-lean jump, a mixture control factor, for at least a first predetermined time, to cause a shift of the lambda value toward rich, wherein the mixture control factor sets the air-to-fuel mixture;
   detecting, by the lambda probe, a lean-to-rich jump of the lambda value; and
   varying, by the control apparatus, upon detection of the lean-to-rich jump, the mixture control factor to cause an additional defined shift of the lambda value toward rich.

2. The method according to claim 1, wherein the additional defined shift of the lambda value toward rich is caused by a defined increase in the mixture control factor over a second predetermined time.

3. The method according to claim 2, wherein that the mixture control factor is increased further when a rich-to-lean jump is detected, by the lambda probe, during the first predetermined time of the varied mixture control factor.

4. The method according to claim 1, wherein the additional defined shift of the lambda value toward rich is caused by an offset in the mixture control factor and by a subsequent holding time of the offset in the mixture control factor.

5. The method according to claim 1, wherein the additional defined shift of the lambda value toward rich is caused by an offset of the mixture control factor when a rich-to-lean jump is detected, by the lambda probe, during the first predetermined time of the varied mixture control factor.

6. A computer program for operating an internal combustion engine operated with a gas as fuel and wherein a lambda value of an air-to-fuel mixture is regulated by means of lambda control as a function of a signal from a lambda probe, the computer program stored on a machine-readable, non-transitory medium and including computer-executable instructions to cause, when executed by a computer,
   detection, via the lambda probe, of a rich-to-lean jump of the lambda value;
   upon detection of the rich-to-lean jump, variation of a mixture control factor for at least a first predetermined time, to cause a shift of the lambda value toward rich, wherein the mixture control factor sets the air-to-fuel mixture composition;
   detection, via the lambda probe, of a lean-to-rich jump of the lambda value; and
   upon detection of the lean-to-rich jump, variation of the mixture control factor to cause an additional defined shift of the lambda value toward rich.

7. The computer program according to claim 6, wherein the computer includes a control apparatus of the internal combustion engine.

8. The method according to claim 1, wherein the signal is a voltage signal.

9. The method according to claim 8, wherein the voltage of the signal is a first value when the lambda value is equal to or below a predefined threshold value and the voltage of the signal is a second value when the lambda value is above the predefined threshold value.

10. The method according to claim 9, wherein the first value is less than the second value.

* * * * *